Nov. 23, 1948.                E. A. LINKE                2,454,562
                    CURRENT COLLECTOR BRUSH MECHANISM
                         Filed Oct. 17, 1946
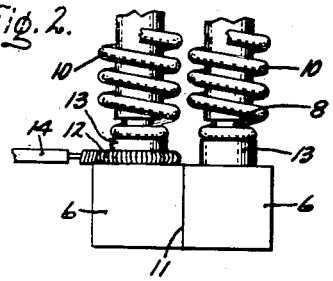
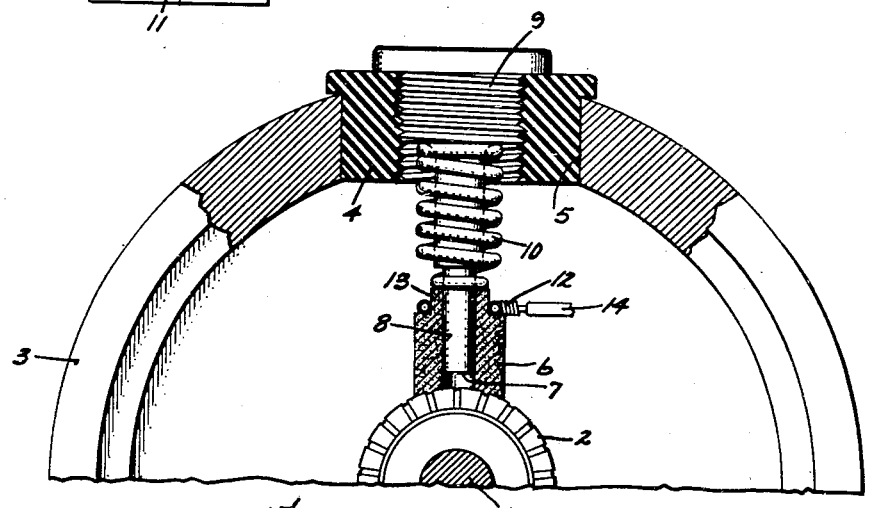
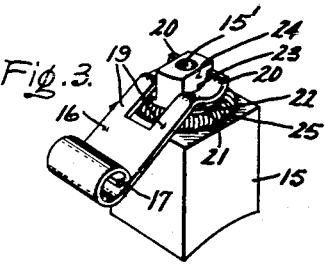
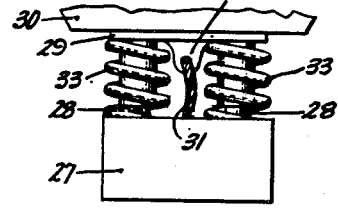
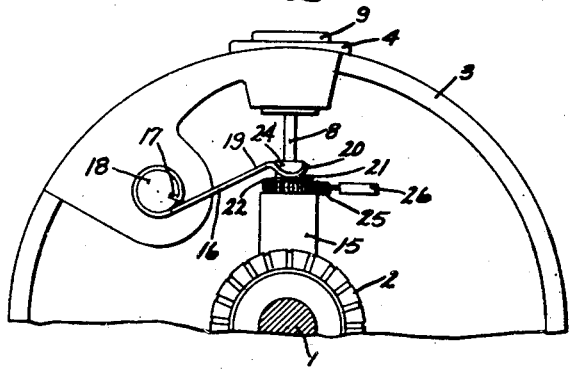
Inventor:
Ernest A. Linke,
by Browell E. Mack
His Attorney.

Patented Nov. 23, 1948

2,454,562

UNITED STATES PATENT OFFICE 2,454,562

CURRENT COLLECTOR BRUSH MECHANISM

Ernest A. Linke, Fort Wayne, Ind., assignor to General Electric Company, a corporation of New York Application October 17, 1946, Serial No. 703,873

13 Claims. (Cl. 171—323)

1

My invention relates to current collector brush mechanisms and is particularly directed to a construction for reducing the overall size of such mechanisms.

An object of my invention is to provide an improved current collector brush mechanism.

Another object of my invention is to provide a current collector brush mechanism having a minimum size for a given size collector brush.

Further objects and advantages of my invention will become apparent and my invention will be better understood from the following description referring to the accompanying drawing, and the features of novelty which characterize my invention will be pointed out with particularity in the claims annexed to and forming part of this specification.

In the drawing, Fig. 1 is a partial sectional view illustrating an embodiment of my improved current collector brush mechanism applied to a dynamoelectric machine; Fig. 2 is a side elevational view illustrating a modification of the arrangement shown in Fig. 1 with a part of the supporting structure broken away; Fig. 3 is a perspective view of another embodiment of my invention illustrating the brush and the biasing spring construction; Fig. 4 is an end elevational view illustrating the construction shown in Fig. 3 applied to a dynamoelectric machine; and Fig. 5 is an end view, partly broken away, showing a further embodiment of my invention.

Referring to Fig. 1 of the drawing, I have shown an embodiment of my improved current collector brush mechanism applied to a dynamoelectric machine having a suitable shaft 1 for the rotatable member of the machine on which a current collector, such as a commutator 2 is mounted. This rotatable member of the machine is adapted to be supported in any suitable manner and may be mounted in a stationary frame 3 which is adapted to support the current collector brush mechanism. In this construction, the brush mechanism is shown as comprising a stationary supporting member 4 formed as a bushing of any suitable insulating material which may be pressed into an opening 5 in the stationary frame 3 of the machine. If desired, the insulating supporting member 4 may be further secured in position by the application of an adhesive between the outer surface thereof and the contacting surface of the opening 5.

In order to obtain a current collector brush mechanism of minimum size for a given size collector brush, all external mounting and guiding members for the collector brush are eliminated,

2 and I provide a brush 6 of electrically conductive material, such as graphite, which is formed with a substantially cylindrical opening 7 therein arranged with a sliding fit around a guide pin member 8 having a substantially cylindrical outer contour and adapted to be held rigidly and stationary in electrically insulated relationship to the stationary frame member 3 of the machine by being mounted on the insulating supporting member 4. This mounting is provided in the illustrated arrangement by securing the guide pin member 8 to a cap 9 which is removably secured to the insulating mounting member 4 by threaded engagement therewith in such a manner as to support the guide member 8 in a position extending inwardly toward the rotatable current collector 2, with the inner end of the guide pin member 8 spaced radially from the outer surface of the current collector 2. In this arrangement, the collector brush 6 is adapted to be biased resiliently towards the rotatable current collector for electrical contact therewith by a resilient coil spring 10 arranged around the guide pin member 8 and in engagement with the outer end of the brush 6 and the inner end of the cap 9 so as to retain the biasing spring 10 under compression between the brush 6 and the cap 9. Thus, the current collector brush 6 is resiliently biased towards the current collector 2 and is freely guided for radial movement relative to the current collector by the guide pin member 8 without additional enclosure around the brush, thereby minimizing the space required for this brush mechanism.

In Fig. 2 of the drawing, I have shown a modification of the arrangement shown in Fig. 1 in which two brushes 6 made in the same manner as that shown in Fig. 1 are each mounted on a guide pin member 8 and are arranged axially side-by-side as shown in this figure which illustrates a side elevational view at right angles to the arrangement shown in Fig. 1. In some installations, this may be found particularly desirable, as the flat sides 11 of the two brushes 6 bear against each other and will tend to prevent rotation of the brush around the brush holder guide pin portion 8 and will thereby minimize the possibility of poor contact between the brushes 6 and the current collector 2 in an arrangement such as that shown in Fig. 1. In other respects, this arrangement is the same as that shown in Fig. 1, and the individual brushes 6 are adapted to be connected to any desired terminal by a suitable connector, such as a garter spring 12, which may be arranged around a neck portion 13 of the brush and connected to a suitable lead 14.

In Figs. 3 and 4, I have shown a further modification of my improved current collector brush mechanism which may be utilized with one or more brushes, as shown in Fig. 2, but is particularly useful where a single brush is to be provided. In this construction, a brush member 15 of suitable material, such as a carbonaceous or graphitic material, is provided having a central substantially cylindrical opening 15' therethrough similar to that shown in Figs. 1 and 2. This brush central opening is adapted to be arranged around a guide pin member 8 the same as that shown in Fig. 1 which is suitably mounted on a cap 9 arranged in an insulator 4 mounted in a stationary member 3. In this construction, the brush is biased towards a current collector 2 mounted on a shaft 1 of a rotating electrical member by a spring arm 16 which is secured by an inturned end 17 to a pin 18 mounted on the stationary member 3. This arm 16 is provided with a bifurcated end including a pair of fingers 19, the ends 20 of which are curved to provide a contact-engaging surface adapted to engage a flat contact surface 21 formed on the neck portion 22 of the brush 15 and each end is also provided with a flat edge 23 adapted to engage a substantially flat surface 24 on the neck 22 of the brush 15. This arrangement provides for biasing the brush downwardly towards the current collector 2 and prevents rotation of the brush relative to the pin 8 which extends into the central opening 16 in the brush. As in the arrangements shown in Figs. 1 and 2, a suitable connector, such as a garter spring 25, may be arranged around the neck 22 of the brush and connected to a lead 26 adapted to connect the brush to a suitable terminal.

In Fig. 5 I have shown a further modification of my improved brush construction in which a brush 27 of suitable electrically conductive material, such as carbon, graphite, etc., is formed with a pair of substantially cylindrical openings extending longitudinally therethrough and adapted to be arranged around guide pins 28 which are suitably mounted in an insulating support 29 secured in a stationary mounting member 30. In this construction, the two pins 28 function to prevent turning of the brush 27 about the guide pin openings and thereby assure against an undesirable braking or poor electrical contact which might result from such brush rotation. In the large brush such as that shown in this construction, it may be found desirable to provide a flexible or pigtail connection 31 suitably anchored in the material of the brush 27 and electrically connected to a suitable terminal 32. The brush 27 in this construction is adapted to be biased towards a current collector in the same manner as that shown in Figs. 1 and 2 by the provision of suitable resilient coil springs 33 extending between the insulating support 29 and the upper surface of the brush 27.

While I have illustrated and described particular embodiments of my invention, modifications thereof will occur to those skilled in the art. I desire it to be understood, therefore, that my invention is not to be limited to the particular arrangements disclosed, and I intend in the appended claims to cover all modifications which do not depart from the spirit and scope of my invention.

What I claim as new and desire to secure by Letters Patent of the United States is:

1. A current collector brush mechanism for use with a rotatable current collector, said brush mechanism comprising a stationary guide member, a brush of electrically conductive material with an opening therein forming a sliding fit around said guide member, and spring means engaging the end of said brush away from said rotatable current collector for resiliently biasing said brush toward the rotatable current collector for electrical contact therewith.

2. A current collector brush mechanism for use with a rotatable current collector, said brush mechanism comprising a stationary guide member of electrically conductive material, a brush of electrically conductive material with an opening therein forming a sliding fit around said guide member, and spring means engaging the end of said brush away from said rotatable current collector for resiliently biasing said brush toward the rotatable current collector for electrical contact therewith.

3. A current collector brush mechanism for use with a rotatable current collector, said brush mechanism comprising a stationary guide member of electrically conductive material, a brush of electrically conductive material with an opening therein forming a sliding fit around said guide member, and means for resiliently biasing said brush toward the rotatable current collector for electrical contact therewith and for restraining rotation of said brush around said guide member.

4. A current collector brush mechanism for use with a rotatable current collector, said brush mechanism comprising a stationary substantially cylindrical guide pin of electrically conductive material, a brush of electrically conductive material with a substantially central cylindrical opening therein forming a sliding fit around said guide pin, and means including a resilient coil spring arranged around said guide pin and engaging the outer end of said brush for biasing said brush toward the rotatable current collector.

5. A current collector brush mechanism for use with a rotatable current collector, said brush mechanism comprising a stationary insulating supporting member, a stationary guide member of electrically conductive material removably mounted on said insulating supporting member in a position extending inwardly toward the rotatable current collector, a brush of electrically conductive material with an opening therein forming a sliding fit around said guide member, and spring means engaging the end of said brush away from said rotatable current collector for resiliently biasing said brush toward the rotatable current collector for electrical contact therewith.

6. A current collector brush mechanism for use with a rotatable current collector, said brush mechanism comprising a stationary insulating supporting member, a stationary substantially cylindrical guide pin of electrically conductive material mounted on said insulating supporting member in a position extending inwardly toward the rotatable current collector, a brush of electrically conductive material with a substantially central cylindrical opening therein forming a sliding fit around said guide pin, and means including a resilient coil spring engaging said brush for resiliently biasing said brush toward the rotatable current collector for electrical contact therewith.

7. A current collector brush mechanism for use with a rotatable current collector, said brush mechanism comprising a stationary insulating supporting member, a stationary guide member of electrically conductive material removably mounted on said insulating supporting member in a position extending inwardly toward the rotatable current collector, a brush of electrically conductive material with an opening therein forming a sliding fit around said guide member, and means including a resilient coil spring engaging the outer end of said brush for resiliently biasing said brush toward the rotatable current collector for electrical contact therewith.

8. A current collector brush mechanism for use with a rotatable current collector, said brush mechanism comprising a stationary insulating supporting member, a stationary substantially cylindrical guide pin of electrically conductive material mounted on said insulating supporting member in a position extending inwardly toward the rotatable current collector, a brush of electrically conductive material with a cylindrical opening therein forming a sliding fit around said guide pin, and means including a resilient coil spring arranged around said guide pin for resiliently biasing said brush toward the rotatable current collector for electrical contact therewith.

9. A current collector brush mechanism for use with a rotatable current collector, said brush mechanism comprising a stationary insulating supporting member, a stationary substantially cylindrical guide pin member of electrically conductive material, means including a cap for removably mounting said guide pin member on said insulating supporting member in a position extending inwardly toward the rotatable current collector, a brush of electrically conductive material with a substantially central cylindrical opening therein forming a sliding fit around said guide pin member, and means including a resilient coil spring arranged around said guide pin member and engaging the outer end of said brush and said cap for biasing said brush toward the rotatable current collector for electrical contact therewith.

10. A current collector brush mechanism for use with a rotatable current collector, said brush mechanism comprising a stationary guide member of electrically conductive material, a brush of electrically conductive material with an upwardly extending neck with a pair of flat sides and an opening therein forming a sliding fit around said guide member, and means including a spring arm for resiliently biasing said brush toward the rotatable current collector for electrical contact therewith, said spring arm having fingers with flat portions arranged in engagement with said brush neck flat sides for restraining rotation of said brush around said guide member.

11. A current collector brush mechanism for use with a rotatable current collector, said brush mechanism comprising a pair of stationary guide members arranged spaced axially of the current collector, a pair of brushes of electrically conductive material with openings therein forming sliding fits around each of said guide members and having substantially flat engaging adjacent sides, and means for resiliently biasing said brush toward the rotatable current collector for electrical contact therewith.

12. A current collector brush mechanism for use with a rotatable current collector, said brush mechanism comprising a pair of stationary guide members arranged spaced axially of said current collector, a brush of electrically conductive material with an opening therein forming a sliding fit around each of said guide members and having substantially flat engaging adjacent sides, and means for resiliently biasing said brushes toward the rotatable current collector for electrical contact therewith.

13. A current collector brush mechanism for use with a rotatable current collector, said brush mechanism comprising a pair of stationary guide members arranged spaced axially of the current collector, a brush of electrically conductive material with openings therein forming sliding fits around each of said guide members, and means for resiliently biasing said brush toward the rotatable current collector for electrical contact therewith.

ERNEST A. LINKE.

REFERENCES CITED

The following references are of record in the file of this patent:

UNITED STATES PATENTS

| Number | Name | Date |
| --- | --- | --- |
| 455,518 | Riker | July 7, 1891 |